United States Patent
Col et al.

(10) Patent No.: US 7,937,561 B2
(45) Date of Patent: May 3, 2011

(54) MERGE MICROINSTRUCTION FOR MINIMIZING SOURCE DEPENDENCIES IN OUT-OF-ORDER EXECUTION MICROPROCESSOR WITH VARIABLE DATA SIZE MACROARCHITECTURE

(75) Inventors: Gerard M. Col, Austin, TX (US); Terry Parks, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 539 days.

(21) Appl. No.: 12/062,028

(22) Filed: Apr. 3, 2008

(65) Prior Publication Data
US 2009/0254735 A1 Oct. 8, 2009

(51) Int. Cl.
*G06F 9/30* (2006.01)

(52) U.S. Cl. ........................................ 712/208

(58) Field of Classification Search .................. None
See application file for complete search history.

(56) References Cited

U.S. PATENT DOCUMENTS

| | | | | |
|---|---|---|---|---|
| 5,790,827 | A * | 8/1998 | Leung | 712/216 |
| 5,884,070 | A * | 3/1999 | Panwar | 712/222 |
| 6,094,719 | A * | 7/2000 | Panwar | 712/216 |

OTHER PUBLICATIONS

"Vector Merge High." Developer Connection. http://developer.apple.com/hardwaredrivers/ve/instructions/vec_mergeh.html; accessed May 18, 2007.

"x86 Instructions and Micro-Ops (uops)." http://www.ptlsim.org/Documentation/html/node7.html#SECTION02530000000000000000; accessed Nov. 26, 2007.

"Stores" http://www.ptlsim.org/Documentation/html/node27.html#SECTION05810000000000000000; accessed Nov. 26, 2007.

"PTLism uop Reference." http://www.ptlsim.org/Documentation/html/node33.html; accessed Dec. 12, 2007.

\* cited by examiner

*Primary Examiner* — Robert Fennema
(74) *Attorney, Agent, or Firm* — E. Alan Davis; James W. Huffman

(57) ABSTRACT

A microprocessor processes a macroinstruction that instructs the microprocessor to write an 8-bit result into only a lower 8 bits of an N-bit architected general purpose register. An instruction translator translates the macroinstruction into a merge microinstruction that specifies an N-bit first source register, an 8-bit second source register, and an N-bit destination register to receive an N-bit result. The N-bit first source register and the N-bit destination register are the N-bit architected general purpose register. An execution unit receives the merge microinstruction and responsively generates the N-bit result to be subsequently written to the N-bit architected general purpose register even though the macroinstruction only instructs the microprocessor to write the 8-bit result into the lower 8 bits of the N-bit architected general purpose register. Specifically, the execution unit directs the 8-bit result into the lower 8 bits of the N-bit result and directs the upper N-8 bits of the N-bit first source register into corresponding upper N-8 bits of the N-bit result.

21 Claims, 7 Drawing Sheets

Fig. 2
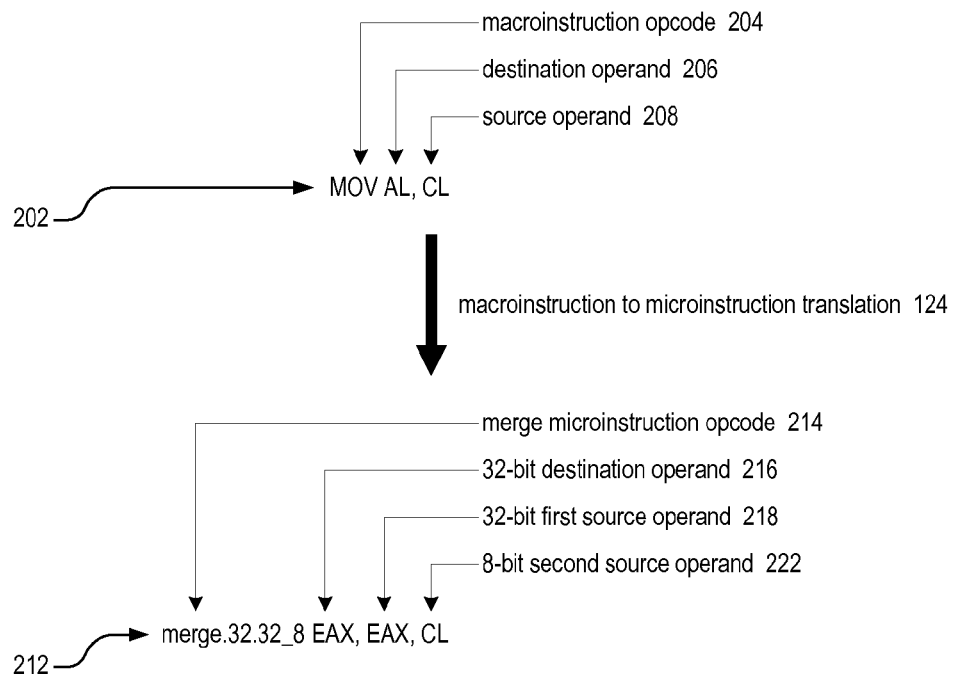
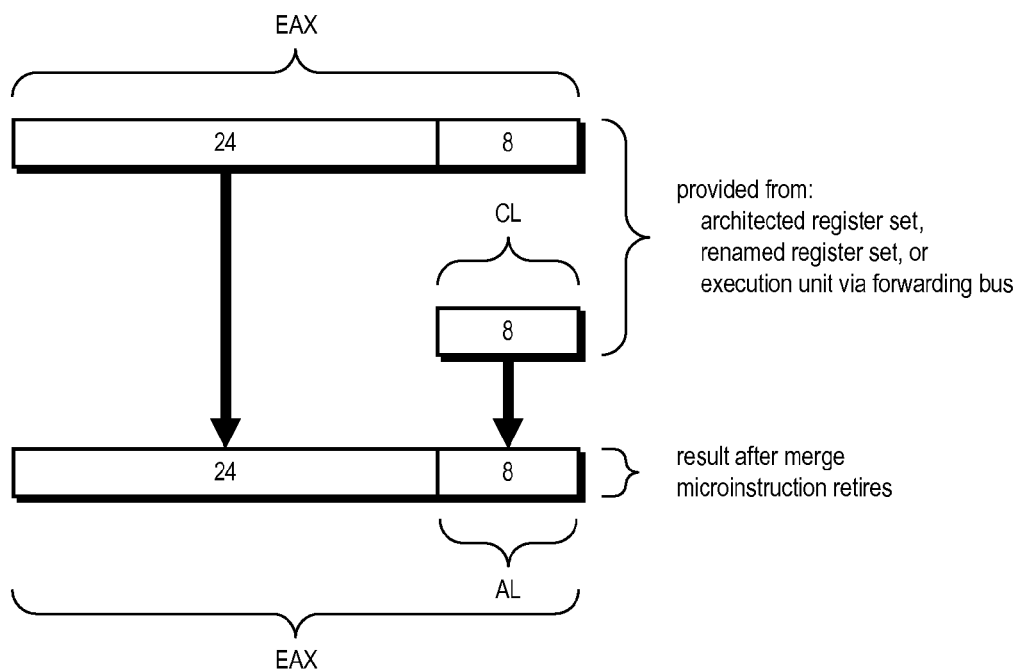

Fig. 4
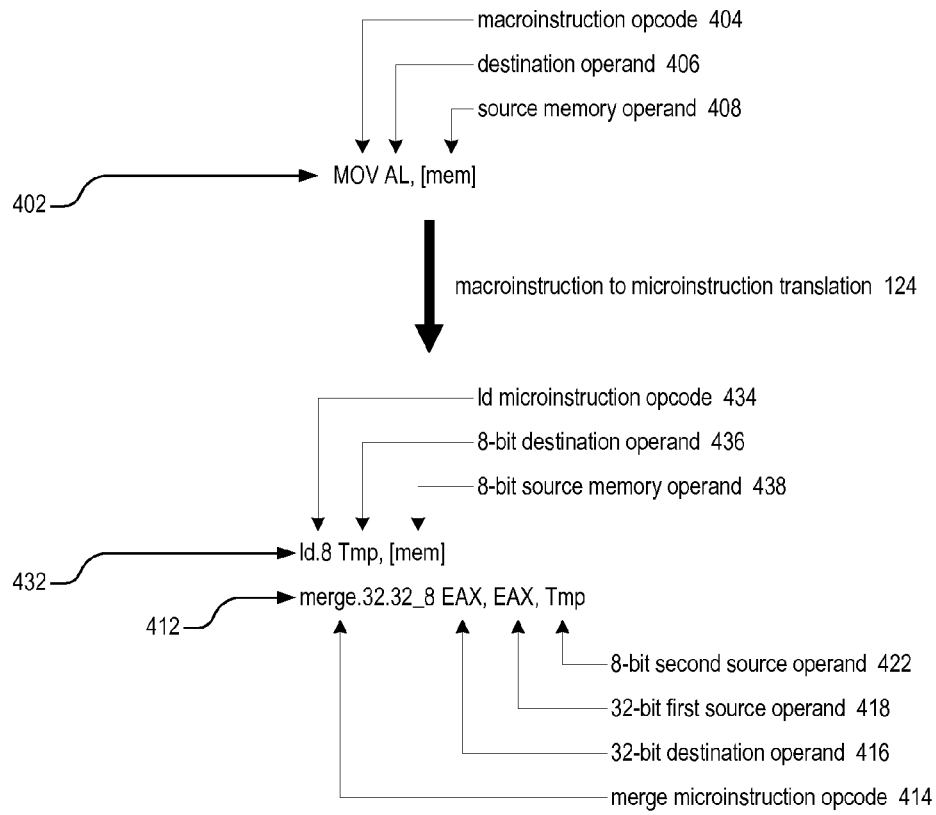
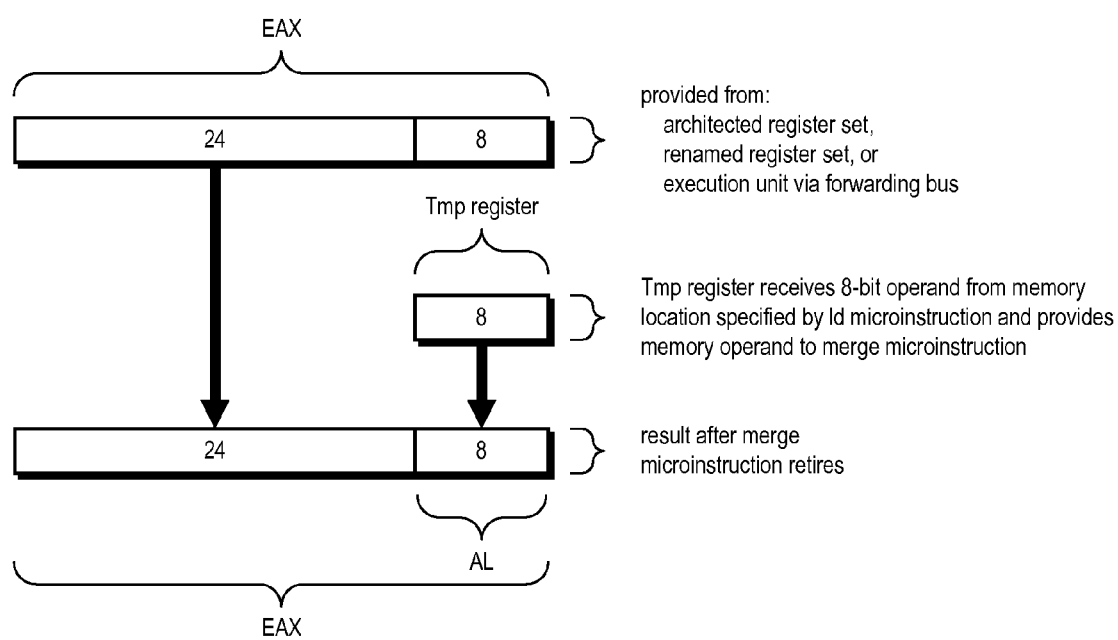

Fig. 5

502 translator translates MOV AL, [mem] macroinstruction into ld.8 Tmp, [mem] and merge.32.32_8 EAX, EAX, Tmp microinstructions 504 allocate unit allocates ROB entry and associated rename register for ld.8 microinstruction and its result; instruction dispatcher dispatches ld.8 microinstruction to reservation station of load execution unit 506 rename unit determines dependencies of merge microinstruction, i.e., supplier instructions that will supply their results as source operands to the merge microinstruction (for the second source operand, this will be the Tmp register specified as the destination register of the ld.8 microinstruction);
allocate unit allocates ROB entry and associated rename register for merge microinstruction and its result;
instruction dispatcher dispatches merge microinstruction to reservation station of execution unit 508 issue logic:
(1) receives source operand dependency tag information from reservation stations, result tag information from execution units, and state information from the ROB;
(2) determines when merge microinstruction source operands are ready (requires only single comparator per execution unit result per source operand);
(3) issues merge microinstruction to execution unit when source operands are ready; and
(4) issues ld.8 microinstruction to load execution unit;

512 load execution unit retrieves source operand from memory and loads it into Tmp register 514 execution unit:
(1) directs Tmp register contents into lower 8 bits of result;
(2) directs into upper 24 bits of result either: upper 24 bits of architected EAX register, upper 24 bits of renamed register of first source operand supplier instruction, or upper 24 bits of result directly from execution unit that executed first source operand supplier instruction; and
(3) loads result to renamed register allocated to merge microinstruction 516 ROB copies value from renamed register of merge microinstruction to architected EAX register and retires ld.8 microinstruction, merge microinstruction, and associated MOV AL, CL macroinstruction Fig. 6
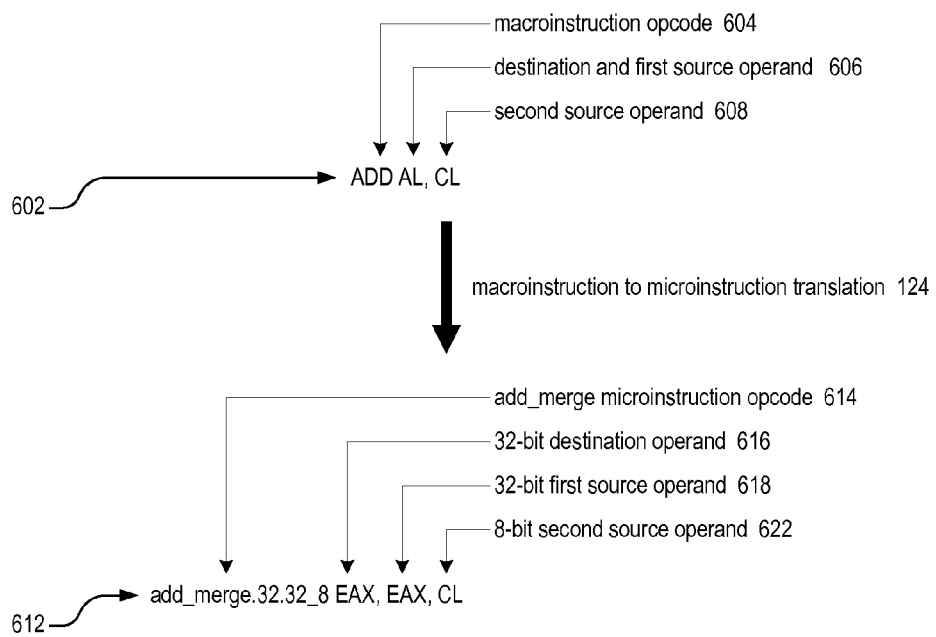
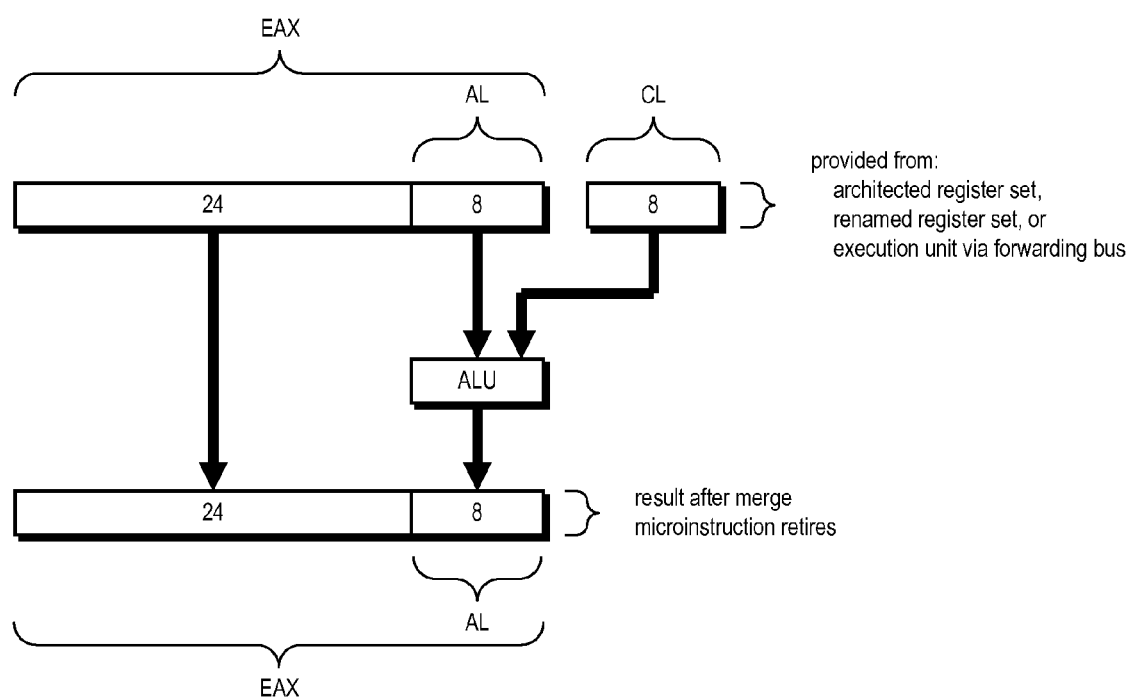

MERGE MICROINSTRUCTION FOR MINIMIZING SOURCE DEPENDENCIES IN OUT-OF-ORDER EXECUTION MICROPROCESSOR WITH VARIABLE DATA SIZE MACROARCHITECTURE

BACKGROUND OF THE INVENTION

1. Field of the Invention

The present invention relates in general to the field of out-of-order execution microprocessors, and more specifically whose out-of-order execution microprocessors architectures permit instructions to address variable size operands.

2. Description of the Related Art

Microprocessors include an architectural set of registers that store instruction operands. For example, the highly popular IA-32 Intel(R) architecture (also commonly referred to as the x86 architecture) includes many registers in its register set, including eight 32-bit general purpose registers, referred to as EAX, EBX, ECX, EDX, EBP, ESI, EDI, and ESP. An instruction may specify registers of the architectural register set to be source registers that store source operands upon which the instruction operates to generate a result. An instruction may also specify a register of the architectural register set to be a destination register that is to receive the result of the instruction. For example, an x86 ADD EAX, EBX instruction adds the contents of the EAX and EBX registers to generate a 32-bit result (i.e., a sum) and places the 32-bit result in the EAX register. Thus, the ADD EAX, EBX instruction specifies the EAX and EBX registers as storing source operands and specifies the EAX register for receiving the result of the addition of the source operands.

Superscalar out-of-order execution processors include multiple execution units that can execute respective instructions in parallel during each clock cycle. In particular, independent instructions can execute out-of-order with respect to one another. However, instructions that consume, or depend upon, (consumer instructions or dependent instructions) the result of a prior instruction (supplier instructions) in the program must wait to execute until the supplier instruction has generated its result and made the result available to the consumer instruction. The processor includes an instruction buffer (or perhaps multiple instruction buffers, such as one per execution unit) that store instructions waiting to be executed by the execution units. The source operands specified by a consumer instruction are often the result of a supplier instruction that has already been executed by an execution unit, is currently being executed by an execution unit, or has yet to be executed by an execution unit. The instructions wait in the instruction buffer to be issued to an execution unit until the source operands are available. When an execution unit generates a result, it writes the result to a non-architecturally-visible register in a renamed register set. However, because the instructions must be retired to the architected register set in program order (due, for example, to the possibility of a branch misprediction or exception condition), it may be several clock cycles until the result is retired from the renamed register set to the architected register set. A superscalar out-of-order execution microprocessor typically improves performance by issuing instructions to an execution unit as soon as possible. In particular, the microprocessor typically forwards supplier instruction results directly to the execution unit that will execute a consumer instruction, which may enable the consumer instruction to execute several clock cycles sooner than it otherwise would if it waited to receive the source operands from the architected register set. The microprocessor determines when a source operand is available by comparing tags output by the execution units identifying the supplier instruction whose result is being output by each execution unit with a dependency tag that identifies the supplier instruction of the source operand.

Some processor architectures allow instructions to write a result that is smaller than the default operand size of the architected register set of the microprocessor, which is 32 bits in the x86 architecture, for example. That is, the instructions write only to a subset of individual registers in the architectural register set. For example, in the IA-32 architecture, the lower 16 bits of the eight general purpose registers map directly to the register set found in the Intel 8086 and 80286 processors and can be referenced with the names AX, BX, CX, DX, BP, SI, DI, and SP. Each of the lower two bytes of the EAX, EBX, ECX, and EDX registers can be referenced by the names AH, BH, CH, and DH (high bytes) and AL, BL, CL, and DL (low bytes). This enables older programs written for the older processors in the x86 family to execute on current IA-32 processors. For example, an x86 ADD AL, BL instruction adds the contents of the AL and BL registers to generate an 8-bit result (i.e., a sum) and places the 8-bit result in the AL register. Thus, the ADD AL, BL instruction specifies the lower 8-bit subsets of the 32-bit EAX and EBX registers as storing source operands and specifies the lower 8-bit subset of the 32-bit EAX register for receiving the result of the addition of the source operands.

A side effect of allowing a supplier instruction to write a result to a subset of an architected register, i.e., to write a result that is smaller than the default operand size of an architected register, is that a subsequent consumer instruction that specifies the full default size architected register as a source operand now depends upon the result of two or more different instructions. For example, consider the following sequence of instructions of a program:

(1) ADD EAX, EBX←supplier instruction
(2) ADD AL, CL←supplier instruction
(3) ADD EDX, EAX←consumer instruction According to this instruction sequence, the ADD EDX, EAX consumer instruction specifies the 32-bit EAX register as a source operand. The lower 8 bits of the source operand are the result of the ADD AL, CL supplier instruction, whereas the upper 24 bits of the source operand are the upper 24 bits of the result of the ADD EAX, EBX supplier instruction. Thus, the consumer instruction must wait in the instruction buffer to be issued until the result of both the supplier instructions are available to the execution unit that will execute the consumer instruction. There are at least two known ways to ensure that the consumer instruction waits in the instruction buffer to issue until all the results of the instructions upon which it depends are available.

According to a first solution, referred to herein as serialization, the microprocessor waits to issue the consumer instruction until all the active instructions in the microprocessor that are older than the consumer instruction have retired their results to the architected register set. This guarantees that the supplier instructions on which the consumer instruction depends have updated the architectural register set such that the execution unit executing the consumer instruction will receive the proper source operand value, which in the example above, guarantees the consumer instruction will receive the 8-bit result of the ADD AL, CL supplier instruction and the upper 24-bit result of the ADD EAX, EBX supplier instruction. However, this is not a very high performance solution since it reduces well-known performance advantages of superscalar out-of-order execution because the consumer instruction must wait longer to execute than it would if the rename register set and/or the execution units generating the supplier instruction results were allowed to immediately provide their results to the execution unit that will execute the consumer instruction.

According to a second solution, the microprocessor may include additional circuitry to determine immediately when both the supplier instruction results are available. Although this solution may yield higher performance than the first solution, an undesirable consequence of the second solution is that it requires more circuitry to implement than the first solution. In particular, the first solution requires a large number of comparator circuits to compare the tags identifying instructions completed by the execution units with the source operand tags of the instructions waiting in the instruction buffer. Specifically, the first solution requires at least N comparators, where N is the product of: (1) the number of instructions that may be waiting in the instruction buffer; (2) the number of possible source operands specified by each instruction waiting in the instruction buffer; and (3) the number of execution units that may provide an instruction result each clock cycle. In contrast, the second solution requires at least double the number of comparators required by the first solution. This is because, as illustrated above, two different execution units may provide their result as a portion of a given source operand to a waiting consumer instruction. That is, the second solution must include the N comparators required by the first solution for as many different portions of each source operand as the source operand may depend upon, which in the example above is twice as many, thus requiring 2N comparators.

Furthermore, in the x86 architecture, the second solution requires triple the number of comparators required by the first solution because instruction sequence scenarios may occur in which a source operand is dependent upon three prior instructions, as illustrated by the following code sequence.

(4) ADD EAX, EBX←supplier instruction
(5) ADD AH, DH←supplier instruction
(6) ADD AL, CL←supplier instruction
(7) ADD EDX, EAX←consumer instruction According to this instruction sequence, the ADD EDX, EAX consumer instruction specifies the 32-bit EAX register as a source operand. The lower 8 bits of the source operand are the result of the ADD AL, CL supplier instruction, the next 8 bits of the source operand are the result of the ADD AH, DH supplier instruction, and the upper 16 bits of the source operand are the upper 16 bits of the result of the ADD EAX, EBX supplier instruction. Thus, the consumer instruction must wait in the instruction buffer to be issued until all three of the supplier instruction results are available to the execution unit that will execute the consumer instruction. Furthermore, the control logic that receives the comparator outputs and determines whether all the source operand components are available is larger in the second solution than the first due to the increase in the number of comparator outputs. Finally, even more circuitry than the additional comparators and control logic is required with the second solution because byte enables that specify which portion of the default operand size a small result is destined for must be stored and routed to the relevant control logic.

A negative consequence of the fact that the second solution requires more circuitry to implement than the first solution is that the additional circuitry takes up a larger amount of semiconductor die area and consumes more power than the first solution. As discussed above, the amount of additional circuitry required is a function of the number of instructions that may be waiting in the instruction buffer, the number of possible source operands specified by each instruction waiting in the instruction buffer, and the number of execution units that may provide an instruction result each clock cycle. Although the number of possible source operands specified by each instruction for a given architecture is fixed, the trend in modern microprocessors is toward increasing the number of execution units to increase the instructions per second that the microprocessor may execute. Furthermore, the trend is toward increasing the number of entries in the instruction buffer in order to increase instruction look-ahead to improve instruction level parallelism to take advantage of the larger number of execution units. Thus, as these parameters of a microprocessor increase, the amount of die area and power consumption consumed by the additional circuitry may be substantial.

Therefore, what is needed is a solution that does not stifle the performance gains of an out-of-order superscalar microprocessor design, but that is also efficient in terms of die area and power consumption.

BRIEF SUMMARY OF INVENTION

The present invention provides a microprocessor that includes a merge microinstruction in its microarchitecture instruction set that always specifies a destination operand that is the default size of the architected register set. An instruction translator translates a small result macroinstruction (i.e., a macroinstruction that generates a result that is smaller than the default operand size of the architected register set) into a merge microinstruction. The merge microinstruction performs effectively the same operation as the small result macroinstruction except that the merge microinstruction also merges the remaining bits (e.g., 24 bits) of the destination register value with the small result (e.g., 8 bits) so that the entire default data size destination register (e.g., 32 bits) is updated by the single merge instruction. Since the single merge microinstruction updates the entire default data size destination register, the source operand of a subsequent consumer microinstruction that depends upon the default size destination register of the supplier merge microinstruction can be guaranteed to depend only upon the result of the single supplier merge microinstruction rather than upon the result of multiple supplier microinstructions. Consequently, advantageously the microprocessor need only include the number of comparators discussed above for the first solution rather than the number of comparators for the second solution; and further advantageously, the microprocessor can enjoy the performance benefits of the second solution, namely out-of-order superscalar execution without having to wait to execute the consumer microinstruction until the supplier microinstructions have retired their results to the architected register set.

In one aspect, the present invention provides an out-of-order execution microprocessor for processing a macroinstruction that instructs the microprocessor to write an 8-bit result into only a lower 8 bits of an N-bit architected general purpose register of the microprocessor. The microprocessor includes an instruction translator, configured to translate the macroinstruction into a merge microinstruction. The merge microinstruction specifies an N-bit first source register, an 8-bit second source register, and an N-bit destination register to receive an N-bit result. The N-bit first source register and the N-bit destination register are the N-bit architected general purpose register specified by the macroinstruction. The microprocessor also includes an execution unit, coupled to the instruction translator, configured to receive the merge microinstruction and to responsively generate the N-bit result to be subsequently written to the N-bit architected general purpose register specified by the macroinstruction even though the macroinstruction only instructs the microprocessor to write the 8-bit result into the lower 8 bits of the N-bit architected general purpose register. In order to generate the N-bit result, the execution unit is configured to direct the 8-bit result into the lower 8 bits of the N-bit result and to direct the upper N-8 bits of the N-bit first source register specified by the merge microinstruction into corresponding upper N-8 bits of the N-bit result.

In another aspect, the present invention provides a method for processing a macroinstruction that instructs an out-of-order execution microprocessor to write an 8-bit result into only a lower 8 bits of an N-bit architected general purpose register of the microprocessor. The method includes translating the macroinstruction into a merge microinstruction. The merge microinstruction specifies an N-bit first source register, an 8-bit second source register, and an N-bit destination register to receive an N-bit result, wherein the N-bit first source register and the N-bit destination register are the N-bit architected general purpose register specified by the macroinstruction. The translating is performed by an instruction translator of the microprocessor. The method also includes receiving the merge microinstruction and responsively generating the N-bit result to be subsequently written to the N-bit architected general purpose register specified by the macroinstruction even though the macroinstruction only instructs the microprocessor to write the 8-bit result into the lower 8 bits of the N-bit architected general purpose register. The receiving and the generating the N-bit result are performed by an execution unit of the microprocessor. The generating the N-bit result includes directing the 8-bit result into the lower 8 bits of the N-bit result and directing the upper N-8 bits of the N-bit first source register specified by the merge microinstruction into corresponding upper N-8 bits of the N-bit result.

In another aspect, the present invention provides an out-of-order execution microprocessor for processing a macroinstruction that specifies a move of an 8-bit source register to an 8-bit destination register, wherein the 8-bit destination register is a subset of an N-bit register in the macro-architecture of the microprocessor. The microprocessor includes a translator, configured to translate the macroinstruction into a merge microinstruction. The merge microinstruction specifies an N-bit first source register, an 8-bit second source register, and an N-bit destination register. The first source register and the destination register are the same. The microprocessor also includes an execution unit, coupled to the translator, configured to receive the merge microinstruction. In response to the merge microinstruction, the execution unit loads the 8 bits of the merge microinstruction second source register into the lower 8 bits of the merge microinstruction destination register and loads the upper N-8 bits of the merge microinstruction first source register into corresponding upper N-8 bits of the merge microinstruction destination register.

In another aspect, the present invention provides an out-of-order execution microprocessor for processing a macroinstruction that specifies a move of an 8-bit memory operand to an 8-bit destination register, wherein the 8-bit destination register is a subset of an N-bit register in the macro-architecture of the microprocessor. The microprocessor includes a translator, configured to translate the macroinstruction into a load microinstruction and a merge microinstruction. The load microinstruction loads the 8-bit memory operand into a temporary register that is not excluded in the macro-architecture of the microprocessor. The merge microinstruction specifies an N-bit first source register, the temporary register, and an N-bit destination register. The first source register and the destination register are the same. The microprocessor also includes an execution unit, coupled to the translator, configured to receive the merge microinstruction. In response to the merge microinstruction, the execution unit loads the 8-bit memory operand from the temporary register into the lower 8 bits of the merge microinstruction destination register and loads the upper N-8 bits of the merge microinstruction first source register into corresponding upper N-8 bits of the merge microinstruction destination register.

In another aspect, the present invention provides an out-of-order execution microprocessor for processing a macroinstruction that specifies an arithmetic logic unit (ALU) operation to be performed on an 8-bit source register to generate a result for writing to an 8-bit destination register, wherein the 8-bit destination register is a subset of an N-bit register in the macro-architecture of the microprocessor. The microprocessor includes a translator, configured to translate the macroinstruction into a merge microinstruction. The merge microinstruction specifies an N-bit first source register, an 8-bit second source register, and an N-bit destination register. The first source register and the destination register are the same. The microprocessor also includes an execution unit, coupled to the translator, configured to receive the merge microinstruction. In response to the merge microinstruction, the execution unit performs the ALU operation on the lower 8 bits of the merge microinstruction first source register and the 8 bits of the merge microinstruction second source register to generate an 8-bit result, loads the 8-bit result of the ALU operation into the lower 8 bits of the merge microinstruction destination register, and loads the upper N-8 bits of the merge microinstruction first source register into corresponding upper N-8 bits of the merge microinstruction destination register.

BRIEF DESCRIPTION OF THE DRAWINGS

FIG. 2 is a diagram illustrating how the instruction translator of FIG. 1 translates an x86 MOV AL, CL small result macroinstruction into a merge microinstruction and the operation of the merge microinstruction according to the present invention.

FIG. 4 is a diagram illustrating how the instruction translator of FIG. 1 translates an x86 MOV AL, [mem] small result macroinstruction into a ld.8 microinstruction and a merge microinstruction and the operation of the ld.8 microinstruction and merge microinstruction according to the present invention.

FIG. 5 is a flowchart illustrating operation of the microprocessor of FIG. 1 to execute an x86 MOV AL, [mem] small result macroinstruction of FIG. 4 using a merge microinstruction according to the present invention.

FIG. 6 is a diagram illustrating how the instruction translator of FIG. 1 translates an x86 ADD AL, CL small result macroinstruction into an add_merge microinstruction and the operation of the add_merge microinstruction according to the present invention.

DETAILED DESCRIPTION OF THE INVENTION

The present disclosure should be understood in light of the following definitions.

An "out-of-order execution microprocessor" is a microprocessor that may execute program instructions (or microinstructions translated from the program instructions) within execution units of the microprocessor in a different order than the instructions appear in the program that includes them.

A "macroinstruction set" is the set of instructions the microprocessor understands and will execute. That is, the macroinstruction set is the set of instructions that a programmer writing a program to be executed by the microprocessor can include in the program, such as an operating system or application program.

A "macroinstruction" is an instruction that is included in a program that is stored in memory and which is fetched and executed by the microprocessor. Macroinstructions may also be cached within the microprocessor after they are fetched from the memory. A macroinstruction is an instruction within the macroinstruction set of the macroarchitecture of the microprocessor.

A "microinstruction set" is the set of instructions that are directly executable by the execution units of the microprocessor. That is, the microinstruction set is the set of instructions into which an instruction translator of the microprocessor may translate a macroinstruction or which may make up the microcode routines of the microprocessor.

A "microinstruction" is an instruction that is directly executable by the execution units of a microprocessor. A microinstruction is an instruction within the microinstruction set of the microarchitecture of the microprocessor. In a microprocessor with a microarchitecture that is different than its macroarchitecture, the execution units execute one or more microinstructions to perform the operation specified by a macroinstruction. Although in some embodiments both the macroinstruction set and the microinstruction set may be visible to the programmer, the macroinstruction set and the microinstruction set are two different instruction sets.

A "small result macroinstruction" is a macroinstruction that generates a result that is smaller than the default operand size of the architected register set of the microprocessor (which in the IA-32 architecture is 32 bits, for example).

Figure 1:
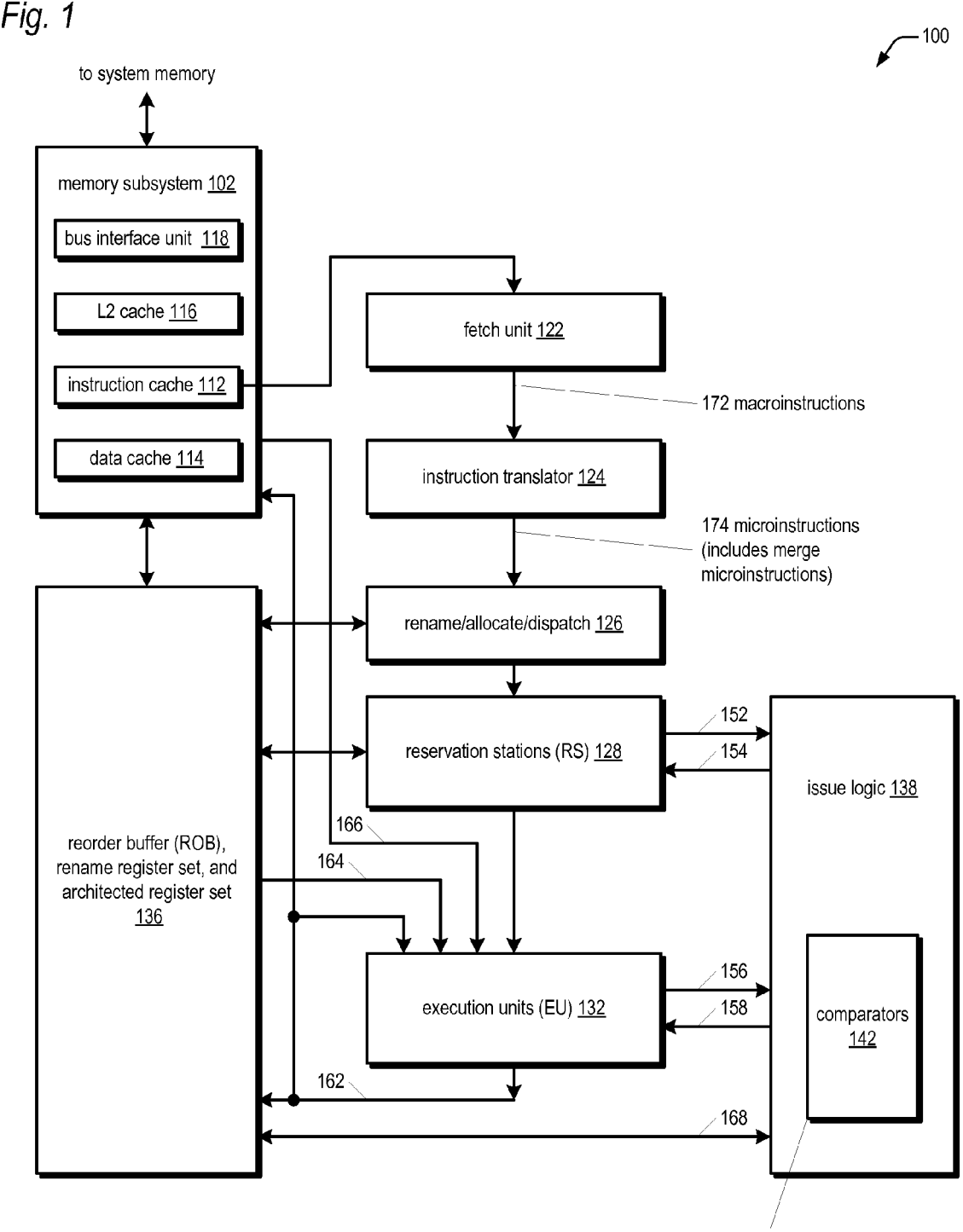
FIG. 1 is a block diagram illustrating an out-of-order execution microprocessor according to the present invention.

Referring now to FIG. 1, a block diagram illustrating an out-of-order execution microprocessor 100 according to the present invention is shown. The microprocessor 100 includes a memory subsystem 102; a fetch unit 122 coupled to the memory subsystem 102; an instruction translator 124 coupled to the fetch unit 122; a rename/allocate/dispatch unit 126 coupled to the instruction translator 124; reservation stations 128 coupled to the rename/allocate/dispatch unit 126; execution units 132 coupled to the reservation stations 128 and memory subsystem 102; a reorder buffer (ROB), rename register set and architected register set 136 coupled to the memory subsystem 102, rename/allocate/dispatch unit 126, reservation stations 128, and execution units 132; and issue logic 138 coupled to the reservation stations 128 and execution units 132. In one embodiment, the macroarchitecture of the microprocessor is the IA-32 macroarchitecture, which includes at least the general purpose registers EAX, EBX, ECX, EDX, EBP, ESI, EDI, and ESP as specified in the IA-32 Intel® Architecture Software Developer's Manuals, Volumes 1, 2A, 2B, 3A, and 3B, June 2006 (hereinafter "IA-32 reference manuals"), which are hereby incorporated by reference in their entirety for all purposes, and also includes at least the macroinstruction set specified in the IA-32 reference manuals.

The memory subsystem 102 includes an instruction cache 112, a data cache 114, a level-2 cache 116, and a bus interface unit 118. The bus interface unit 118 interfaces the memory subsystem 102 to a processor bus that couples the microprocessor 100 to a system memory (not shown). The instruction cache 112 caches macroinstructions fetched from the system memory for execution by the microprocessor 100. The macroinstructions may include small result macroinstructions, typified by the following x86 small result macroinstructions, which are provided only as examples and are not intended to be an exhaustive list of such macroinstructions:

MOV AL, CL (202 of FIG. 2)
MOV AL, [mem] (402 of FIG. 4)
ADD AL, CL (602 of FIG. 6)

The data cache 114 caches data retrieved from the system memory, such as memory operands, and particularly memory operands specified by small result macroinstructions such as the MOV AL, [mem] instruction 402 of FIG. 4. The L2 cache 116 is a unified data cache that backs the instruction cache 112 and the data cache 114.

The fetch unit 122 fetches the macroinstructions from the instruction cache 112 and provides the macroinstructions 172 to the instruction translator 124. The instruction translator 124 translates macroinstructions 172 received from the fetch unit 122 into microinstructions 174. The microinstructions 174 may include merge microinstructions such as the merge microinstruction 212 of FIG. 2, the merger microinstruction 412 of FIG. 4, or the add_merge microinstruction 612 of FIG. 6, as discussed in more detail below. In the case of a small result macroinstruction that specifies a memory source operand, such as the MOV AL, [mem] instruction 402 of FIG. 4, the instruction translator 124 translates the macroinstruction into two microinstructions: a first microinstruction that loads the memory operand from memory and a second microinstruction which is a merge microinstruction, as discussed with respect to FIGS. 4 and 5.

The rename/allocate/dispatch unit 126 receives the microinstructions 174 from the instruction translator 124 and allocates an entry within the ROB 136 for each of the microinstructions 174. Each entry in the ROB 136 has an associated index, or tag, that is used by other parts of the microprocessor 100 to uniquely identify each microinstruction 174. The rename/allocate/dispatch unit 126 allocates the ROB 136 entries for the microinstructions 174 in program order, which enables the ROB 136 to retire microinstructions 174 and their associated macroinstructions 172 in program order. The rename/allocate/dispatch unit 126 then renames the architected destination register of each microinstruction 174 to a register of the rename register set associated with the ROB 136 entry allocated for the microinstruction 174. The rename/allocate/dispatch unit 126 also includes a register allocation table (RAT) that stores the rename information. The rename/allocate/dispatch unit 126 uses the RAT to determine dependencies between the various microinstructions 174. In particular, if a source operand of a microinstruction 174 depends upon the result of another microinstruction 174 (i.e., a supplier microinstruction), the rename/allocate/dispatch unit 126 determines these dependencies. The dependency information comprises a tag of the supplier microinstruction for each source operand. The rename/allocate/dispatch unit 126 then dispatches the microinstructions 174 and associated dependency information to the reservation stations 128 according to an instruction scheduling algorithm that takes into account the type of each microinstruction 174 ready for dispatch, the types of microinstructions each execution unit 132 is capable of executing, and the current depth of the reservation station 128 associated with each execution unit 132, among other factors.

The reservation stations 128 are instruction buffers that receive the microinstructions 174 from the rename/allocate/dispatch unit 126 along with the associated source operand dependency information. A microinstruction 174 waits in its reservation station 128 until the issue logic 138 issues it to the execution unit 132 associated with the reservation station 128. The execution units 132 receive source operands 166 from the memory subsystem 102. The execution units 132 also receive source operands 164 from the rename register set 136. The execution units 132 also receive source operands 162 which are instruction results directly forwarded from the execution units 132. The execution unit 132 results are also written to the rename register set 136. Finally, the execution unit 132 results 162 may also be written to the memory subsystem 102.

The execution units 132 include a plurality of execution units 132, each capable of executing various types of microinstructions 174. In one embodiment, the execution units 132 include seven individual execution units as follows: a MEDIA A unit that executes floating point microinstructions; a MEDIA B unit that executes multiply microinstructions; a SINT (Simple Integer) unit that executes integer ALU microinstructions that perform integer arithmetic or logical operations, such as the merge microinstruction 212 of FIG. 2, the merge microinstruction 412 of FIG. 4, or the add_merge microinstruction 612 of FIG. 4; a MOV/BR (Move/Branch) unit that executes move or branch microinstructions as well as simple ALU operations that the SINT unit also executes; a LD (Load Data) unit that fetches source operands from memory into registers of the microprocessor 100; a STA (Store Address) unit that calculates the destination memory address for microinstructions that perform memory store operations and writes the calculated destination memory address into a store buffer allocated for the microinstructions that perform memory store operations; a STD (Store Data) unit that stores the results of microinstructions from registers to an address in memory specified by the STA Unit for microinstructions that perform memory store operations. Other embodiments are contemplated that include more or fewer execution units 132 depending on design requirements and constraints. The execution units 132 execute microinstructions in parallel such that all of the execution units 132 can generate a microinstruction result in the same clock cycle.

The issue logic 138 receives from the reservation stations 128 source operand dependency tags 152 that identify the supplier microinstruction of each source operand. Advantageously, the reservation stations 128 store in their entries only a single source operand dependency tag for each source operand of the microinstruction stored in the entry. This is possible because the merge microinstructions of the present invention guarantee that even though the small result macroinstructions generate a result that is smaller than the default operand size of the architected register set of the microprocessor, each source operand is dependent upon only a single microinstruction, rather than multiple microinstructions. The issue logic 138 also receives from the execution units 132 result tags 156 that identify the microinstruction whose result is currently being output by each of the execution units 132. The issue logic 138 also receives state information 168 from the rename ROB 136 indicating the state of the result of each instruction in the ROB 136, i.e., whether the result has been generated yet by an execution unit 132, and if so, whether the result has been written to the rename register set 136, and if so, whether the result has been retired to the architected register set 136. The issue logic 138 includes comparators 142 that compare the source operand dependency tags 152 and the result tags 156. The comparators 142 provide the comparison results to control logic within the issue logic 138 that determines whether the source operands for the microinstructions 174 waiting in the reservation stations 128 are available based on the information 152/156/168 received from the reservation stations 128, execution units 132, and ROB 136. The issue logic 138 responsively generates control signals 154 to control issuance of microinstructions 174 from the reservation stations 128 to the execution units 132. Finally, the issue logic 138 generates control signals 158 to multiplexing logic within the execution units 132 to guarantee that the correct source operands are provided to each execution unit 132 during a given clock cycle from the correct sources, namely the memory subsystem 102, rename register set 136, and architected register set 136. The issue logic 138 is hardware circuitry that may issue microinstructions to the execution units 132 out of the order in which they were placed into the reservation stations 128. In one embodiment, if in a given clock cycle multiple microinstructions are ready (i.e., if all the source operands are available) in a given reservation station 128, the issue logic 138 issues the oldest of the ready microinstructions to the execution unit 132. In one embodiment, the issue logic 138 may operationally reside within the execution units 132 themselves. Advantageously, the number of comparators 142 required by the microprocessor 100 is minimized because the merge microinstructions disclosed herein ensure that each source operand is dependent upon only a single microinstruction, rather than multiple microinstructions, as described herein.

Referring now to FIG. 2, a diagram illustrating how the instruction translator 124 of FIG. 1 translates an x86 MOV AL, CL small result macroinstruction 202 into a merge microinstruction 212 and the operation of the merge microinstruction 212 according to the present invention is shown. The x86 MOV AL, CL small result macroinstruction 202 includes a macroinstruction opcode 204 that uniquely identifies the MOV macroinstruction from other macroinstructions in the macroinstruction set, a destination register field 206 (which specifies the 8-bit AL register in the example of FIG. 2), and a source register field 208 (which specifies the 8-bit CL register in the example of FIG. 2). That is, in the example of FIG. 2, the x86 MOV AL, CL small result macroinstruction 202 specifies the 8-bit CL register value as the single source operand and the 8-bit AL register as the destination operand location. Specifically, the x86 MOV AL, CL small result macroinstruction 202 instructs the microprocessor 100 to copy the contents of the 8-bit CL register into the 8-bit AL register.

The instruction translator 124 of the present invention translates the x86 MOV AL, CL small result macroinstruction 202 into a merge.32.32_8 EAX, EAX, CL microinstruction 212. The merge.32.32_8 EAX, EAX, CL microinstruction 212 includes a merge microinstruction opcode 214 that uniquely identifies the merge microinstruction from other microinstructions in the microinstruction set, a 32-bit destination register field 216 (which specifies the 32-bit EAX register in the example of FIG. 2), a 32-bit first source register field 218 (which specifies the 32-bit EAX register in the example of FIG. 2), and an 8-bit second source register field 222 (which specifies the 8-bit CL register in the example of FIG. 2). That is, in the example of FIG. 2, the merge.32.32_8 EAX, EAX, CL microinstruction 212 specifies the 32-bit EAX register value as a first source operand 218, the 8-bit CL register value as a second source operand 222, and the 32-bit EAX register as the destination operand 216. Specifically, the merge.32.32_8 EAX, EAX, CL microinstruction 212 instructs the microprocessor 100 to copy the contents of the CL register into the AL register and the copy the contents of the upper 24 bits of the EAX register into the upper 24 bits of the EAX register, as shown in the lower portion of FIG. 2. However, it is understood that because the microprocessor 100 is an out-of-order superscalar microprocessor, the source operand values of the merge.32.32_8 EAX, EAX, CL microinstruction 212 may be received from any of the following sources, depending upon which source is supplying the newest version of the source data, i.e., depending upon which source is supplying the result from the supplier instruction specified by the source operand dependency tag information 152: the architected register set 136, the rename register set 136, or directly from an execution unit 132 via the forwarding bus. In particular, the merge microinstruction always specifies a default operand size architected destination register, which in the example of FIG. 2 is 32-bits. Additionally, the merge microinstruction always specifies the first source register 218 and the destination register 216 to be the same architected register. Advantageously, because the merge microinstruction 212 always specifies a default operand size architected destination register 216, when the merge microinstruction 212 acts as a supplier microinstruction it guarantees that the relevant source operand of the consumer microinstruction will be dependent upon only a single microinstruction, rather than multiple microinstructions.

Figure 3:
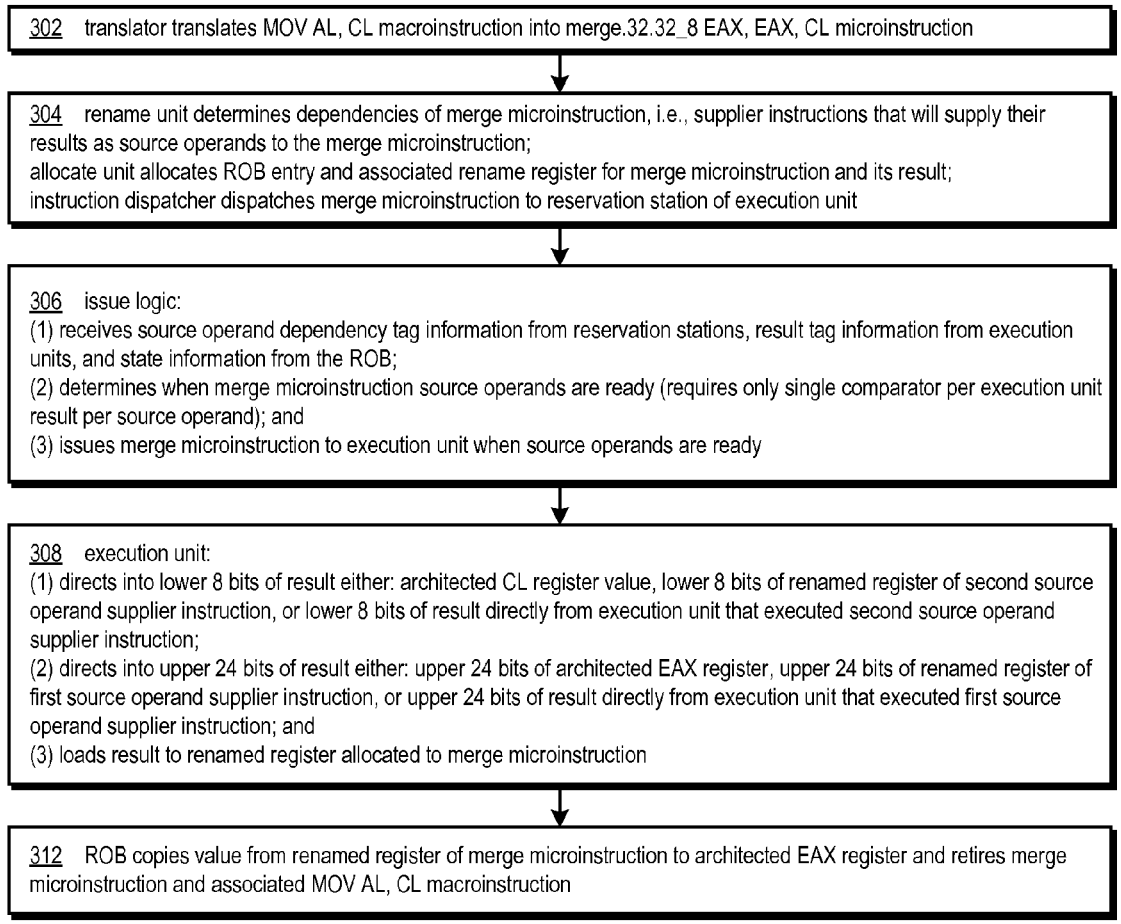
FIG. 3 is a flowchart illustrating operation of the microprocessor of FIG. 1 to execute an x86 MOV AL, CL small result macroinstruction using a merge microinstruction of FIG. 2 according to the present invention.

Referring now to FIG. 3, a flowchart illustrating operation of the microprocessor 100 of FIG. 1 to execute an x86 MOV AL, CL small result macroinstruction 202 using a merge microinstruction 212 of FIG. 2 according to the present invention is shown. Flow begins at block 302.

At block 302, the instruction translator 124 of FIG. 1 translates an x86 MOV AL, CL small result macroinstruction 202 of FIG. 2 into a merge.32.32_8 EAX, EAX, CL microinstruction 212 of FIG. 2. Flow proceeds to block 304.

At block 304, the rename/allocate/dispatch unit 126 determines dependencies of the source operands 218/222 of FIG. 2 of the merge microinstruction 212 on supplier microinstructions. The rename/allocate/dispatch unit 126 also allocates an entry in the ROB 136 for the merge microinstruction 212 and an associated register in the rename register set 136 for its result. The rename/allocate/dispatch unit 126 then dispatches the merge microinstruction 212 and its associated source operand dependency tags 152 to a reservation station 128 of one of the execution units 132. In one embodiment, the merge microinstruction 212 is dispatched to either the SINT (Simple Integer) unit or MOV/BR (Move/Branch) unit discussed above. Flow proceeds to block 306.

At block 306, the issue logic 138 receives the source operand dependency tags 152 from the reservation stations 128, the results tags 156 from the execution units 132, and the state information 168 from the ROB 136. In response, the issue logic 138 determines when all of the merge microinstruction 212 source operands 218/222 are ready based on the received information 152/156/168. Advantageously, as discussed above, the issue logic 138 need only include N comparators 142, where N is the product of the number of execution units 132 (which is 7 according to one embodiment), the number of entries in the reservation stations 128 (which is 76 according to one embodiment), and the number of possible source operands of a microinstruction (which is 2 according to one embodiment). In one embodiment, the number of ROB 136 entries is 48, thus requiring 6-bit tags (however, it is noted that even larger tags may be required for an embodiment with a larger ROB 136). Thus, in one embodiment, the issue logic 138 includes 1064 comparators that are each 6 bits. Advantageously, in the case of an x86 embodiment, the additional die space and power consumption of twice this number of comparators is saved. Once all of the source operands of the merge microinstruction 212 are available, the issue logic 138 issues the merge microinstruction 212 to the appropriate execution unit 132. Flow proceeds to block 308.

At block 308, the execution unit 132 to which the merge.32.32_8 EAX, EAX, CL microinstruction 212 was issued at block 306 forms the result of the merge microinstruction 212 in response to the merge microinstruction 212 and to the multiplexing control signals 158 as follows. The execution unit 132 directs into the lower 8 bits of the result either the contents of the architected CL register, the lower 8 bits of the renamed register of the supplier instruction indicated by the source operand dependency tag 152 associated with the 8-bit second source operand 222 (i.e., the CL source operand in the example), or the lower 8 bits of the result directly from the execution unit 132 that just executed the supplier microinstruction of the second merge microinstruction 212 second source operand 222, as controlled by the multiplexing control signals 158 depending upon which of the three data sources has the newest version of the merge microinstruction 212 second source operand 222. Additionally, execution unit 132 directs into the upper 24 bits of the result either the upper 24 bits of the contents of the architected EAX register, the upper 24 bits of the renamed register of the supplier instruction indicated by the source operand dependency tag 152 associated with the 32-bit first source operand 218 (i.e., the EAX source operand in the example), or the upper 24 bits of the result directly from the execution unit 132 that just executed the supplier microinstruction of the first merge microinstruction 212 first source operand 218, as controlled by the multiplexing control signals 158 depending upon which of the three data sources has the newest version of the merge microinstruction 212 first source operand 218. Finally, the execution unit 132 loads the result into the renamed register that was allocated to the merge microinstruction 212 at block 304. Flow proceeds to block 312.

At block 312, the ROB 136 copies the value from the renamed register allocated to the merge microinstruction 212 to the EAX register in the architected register set 136 and retires the merge microinstruction 212 and associated x86 MOV AL, CL small result macroinstruction 202. Flow ends at block 312.

Referring now to FIG. 4, a diagram illustrating how the instruction translator 124 of FIG. 1 translates an x86 MOV AL, [mem] small result macroinstruction 402 into a ld.8 microinstruction 432 and a merge microinstruction 412 and the operation of the ld.8 microinstruction 432 and merge microinstruction 412 according to the present invention is shown. The x86 MOV AL, [mem] small result macroinstruction 402 includes a macroinstruction opcode 404 that uniquely identifies the MOV macroinstruction from other macroinstructions in the macroinstruction set, a destination register field 406 (which specifies the 8-bit AL register in the example of FIG. 4), and a source memory operand field 408 (which specifies an 8-bit memory location address in the example of FIG. 4). That is, in the example of FIG. 4, the x86 MOV AL, [mem] small result macroinstruction 402 specifies the 8-bit memory operand as the single source operand and the 8-bit AL register as the destination operand location. Specifically, the x86 MOV AL, [mem] small result macroinstruction 402 instructs the microprocessor 100 to copy the contents of the 8-bit source memory operand 408 into the 8-bit AL register.

The instruction translator 124 of the present invention translates the x86 MOV AL, [mem] small result macroinstruction 402 into two microinstructions, namely a ld.8 Tmp, [mem] microinstruction 432 and a merge.32.32_8 EAX, EAX, Tmp microinstruction 412. The ld.8 Tmp, [mem] microinstruction 432 includes a ld.8 microinstruction opcode 434 that uniquely identifies the ld.8 microinstruction from other microinstructions in the microinstruction set, an 8-bit destination register field 436 (which specifies an 8-bit temporary register of the microprocessor 100, which may be included in element 136 of FIG. 1, in the example of FIG. 4), and an 8-bit source register field 438 (which specifies the 8-bit memory operand in the example of FIG. 4). That is, in the example of FIG. 4, the ld.8 Tmp, [mem] microinstruction 432 specifies the 8-bit memory operand as the source operand 438 and the 8-bit Tmp register as the destination operand 436. Specifically, the ld.8 Tmp, [mem] microinstruction 432 instructs the microprocessor 100 to load the 8-bit memory operand into the Tmp register, as stated in the lower portion of FIG. 4. The memory subsystem 102 reads the 8-bit memory operand from the data cache 114 or L2 cache 116 if present there, or from the system memory, otherwise.

The merge.32.32_8 EAX, EAX, Tmp microinstruction 412 includes a merge microinstruction opcode 414 that uniquely identifies the merge microinstruction from other microinstructions in the microinstruction set, a 32-bit destination register field 416 (which specifies the 32-bit EAX register in the example of FIG. 4), a 32-bit first source register field 418 (which specifies the 32-bit EAX register in the example of FIG. 4), and an 8-bit second source register field 422 (which specifies an 8-bit Tmp register in the example of FIG. 4). That is, in the example of FIG. 4, the merge.32.32_8 EAX, EAX, Tmp microinstruction 412 specifies the 32-bit EAX register value as a first source operand 418, the 8-bit Tmp register value as a second source operand 422, and the 32-bit EAX register as the destination operand 416. Specifically, the merge.32.32_8 EAX, EAX, Tmp microinstruction 412 instructs the microprocessor 100 to copy the contents of the Tmp register into the AL register and to copy the contents of the upper 24 bits of the EAX register into the upper 24 bits of the EAX register, as shown in the lower portion of FIG. 4. However, it is understood that because the microprocessor 100 is an out-of-order superscalar microprocessor, the first source operand values 418 of the merge.32.32_8 EAX, EAX, Tmp microinstruction 412 may be received from any of the following sources, depending upon which source is supplying the newest version of the source data, i.e., depending upon which source is supplying the result from the supplier instruction specified by the source operand dependency tag information 152: the architected register set 136, the rename register set 136, or directly from an execution unit 132 via the forwarding bus. In particular, the merge microinstruction always specifies a default operand size architected destination register, which in the example of FIG. 4 is 32-bits. Additionally, the merge microinstruction always specifies the first source register 418 and the destination register 416 to be the same architected register. Advantageously, because the merge microinstruction 412 always specifies a default operand size architected destination register 416, when the merge microinstruction 412 acts as a supplier microinstruction it guarantees that the relevant source operand of the consumer microinstruction will be dependent upon only a single microinstruction, rather than multiple microinstructions.

Referring now to FIG. 5, a flowchart illustrating operation of the microprocessor 100 of FIG. 1 to execute an x86 MOV AL, [mem] small result macroinstruction 402 of FIG. 4 using a merge microinstruction 412 according to the present invention is shown. Flow begins at block 502.

At block 502, the instruction translator 124 of FIG. 1 translates an x86 MOV AL, [mem] small result macroinstruction 402 of FIG. 4 into two microinstructions in the following order: a ld.8 Tmp, [mem] microinstruction 432 and a merge.32.32_8 EAX, EAX, Tmp microinstruction 412 of FIG. 4. In one embodiment, the instruction translator 124 emits the ld.8 microinstruction 432 and the merge microinstruction 412 concurrently in the same clock cycle. Because the instruction translator 124 emits the ld.8 microinstruction 432 and then the merge microinstruction 412 in that order, the ROB 136 will retire the two microinstructions in that order. Flow proceeds to block 504.

At block 504, the rename/allocate/dispatch unit 126 allocates an entry in the ROB 136 for the ld.8 microinstruction 432 and an associated register in the rename register set 136 for its result. In one embodiment, the Tmp register 436 is the allocated register in the rename register set 136. The rename/allocate/dispatch unit 126 then dispatches the ld.8 microinstruction 432 to a reservation station 128 of one of the execution units 132. In one embodiment, the ld.8 microinstruction 432 is dispatched to the LD (Load Data) unit discussed above. Flow proceeds to block 506.

At block 506, the rename/allocate/dispatch unit 126 determines dependencies of the source operands 418/422 of FIG. 4 of the merge microinstruction 412 of FIG. 4 on supplier microinstructions. The second source operand 422 will be dependent upon the ld.8 microinstruction 432, and in particular, upon the memory operand destined for the Tmp register specified by the ld.8 microinstruction 432. The rename/allocate/dispatch unit 126 also allocates an entry in the ROB 136 for the merge microinstruction 412 and an associated register in the rename register set 136 for its result. The rename/allocate/dispatch unit 126 then dispatches the merge microinstruction 412 and its associated source operand dependency tags 152 to a reservation station 128 of one of the execution units 132. In one embodiment, the merge microinstruction 412 is dispatched to either the SINT unit or MOV/BR unit discussed above. In one embodiment, the rename/allocate/dispatch unit 126 determines the dependency information, allocates ROB 136 entries, and dispatches the ld.8 microinstruction 432 and merge microinstruction 412 concurrently in the same clock cycle. Flow proceeds to block 508.

At block 508, the issue logic 138 receives the source operand dependency tags 152 from the reservation stations 128, the results tags 156 from the execution units 132, and the state information 168 from the ROB 136, for the ld.8 microinstruction 432 and the merge microinstruction 412. In response, the issue logic 138 determines when all of the merge microinstruction 412 source operands 418/422 are ready based on the received information 152/156/168. Advantageously, as discussed above, the issue logic 138 need only include N comparators 142, where N is the product of the number of execution units 132, the number of entries in the reservation stations 128, and the number of possible source operands of a microinstruction. Once all of the source operands of the merge microinstruction 412 are available, the issue logic 138 issues the merge microinstruction 412 to the appropriate execution unit 132. The issue logic 138 also issues the ld.8 microinstruction 432 to the LD unit. Flow proceeds to block 512.

At block 512, the LD execution unit loads the source memory operand 408 specified by the ld.8 microinstruction 432 into the Tmp register in response to the ld.8 microinstruction 432. In one embodiment, the source memory operand 408 may be received by the LD unit either from the system memory or the memory subsystem 102. It is noted that the source memory operand 408 may also have dependencies upon prior microinstructions that store data to memory, and the source memory operand 408 may be a store instruction result forwarded to the LD unit from the STD unit. Flow proceeds to block 514.

At block 514, the execution unit 132 to which the merge.32.32_8 EAX, EAX, Tmp microinstruction 412 was issued at block 508 forms the result of the merge microinstruction 412 in response to the merge microinstruction 412 and to the multiplexing control signals 158 as follows. The execution unit 132 directs into the lower 8 bits of the result the contents of the Tmp register, as controlled by the multiplexing control signals 158. Additionally, execution unit 132 directs into the upper 24 bits of the result either the upper 24 bits of the contents of the architected EAX register, the upper 24 bits of the renamed register of the supplier instruction indicated by the source operand dependency tag 152 associated with the 32-bit first source operand 418 (i.e., the EAX source operand in the example), or the upper 24 bits of the result directly from the execution unit 132 that just executed the supplier microinstruction of the merge microinstruction 412 first source operand 418, as controlled by the multiplexing control signals 158 depending upon which of the three data sources has the newest version of the merge microinstruction 412 first source operand 418. Finally, the execution unit 132 loads the result into the renamed register that was allocated to the merge microinstruction 412 at block 506. Flow proceeds to block 516.

At block 516, the ROB 136 copies the value from the renamed register allocated to the merge microinstruction 412 to the EAX register in the architected register set 136 and retires the ld.8 microinstruction 432 and the merge microinstruction 412 and associated x86 MOV AL, [mem] small result macroinstruction 402. Flow ends at block 512.

Referring now to FIG. 6, a diagram illustrating how the instruction translator 124 of FIG. 1 translates an x86 ADD AL, CL small result macroinstruction 602 into an add_merge microinstruction 612 and the operation of the add_merge microinstruction 612 according to the present invention is shown. The x86 ADD AL, CL small result macroinstruction 602 includes a macroinstruction opcode 604 that uniquely identifies the ADD macroinstruction from other macroinstructions in the macroinstruction set, a destination and first source register field 606 (which specifies the 8-bit AL register in the example of FIG. 6), and a second source register field 608 (which specifies the 8-bit CL register in the example of FIG. 6). That is, in the example of FIG. 6, the x86 ADD AL, CL small result macroinstruction 602 specifies the 8-bit AL register value as a first source operand, the 8-bit CL register value as a second source operand, and the 8-bit AL register as the destination operand location. Specifically, the x86 ADD AL, CL small result macroinstruction 602 instructs the microprocessor 100 to add the contents of the 8-bit AL register and the 8-bit CL register to generate a sum and to place the sum into the 8-bit AL register.

The instruction translator 124 of the present invention translates the x86 ADD AL, CL small result macroinstruction 602 into an add_merge.32.32_8 EAX, EAX, CL microinstruction 612. The add_merge.32.32_8 EAX, EAX, CL microinstruction 612 includes an add_merge microinstruction opcode 614 that uniquely identifies the add_merge microinstruction from other microinstructions in the microinstruction set, a 32-bit destination register field 616 (which specifies the 32-bit EAX register in the example of FIG. 6), a 32-bit first source register field 618 (which specifies the 32-bit EAX register in the example of FIG. 6), and an 8-bit second source register field 622 (which specifies the 8-bit CL register in the example of FIG. 6). That is, in the example of FIG. 6, the add_merge.32.32_8 EAX, EAX, CL microinstruction 612 specifies the 32-bit EAX register value as a first source operand 618, the 8-bit CL register value as a second source operand 622, and the 32-bit EAX register as the destination operand 616. Specifically, the add_merge.32.32_8 EAX, EAX, CL microinstruction 612 instructs the microprocessor 100 to add the contents of the AL register and the CL register to generate a sum, to place the sum into the AL register, and to copy the contents of the upper 24 bits of the EAX register into the upper 24 bits of the EAX register, as shown in the lower portion of FIG. 6. However, it is understood that because the microprocessor 100 is an out-of-order superscalar microprocessor, the source operand values of the add_merge.32.32_8 EAX, EAX, CL microinstruction 612 may be received from any of the following sources, depending upon which source is supplying the newest version of the source data, i.e., depending upon which source is supplying the result from the supplier instruction specified by the source operand dependency tag information 152: the architected register set 136, the rename register set 136, or directly from an execution unit 132 via the forwarding bus. In particular, the add_merge microinstruction 612 always specifies a default operand size architected destination register, which in the example of FIG. 6 is 32-bits. Additionally, the add_merge microinstruction 612 always specifies the first source register 618 and the destination register 616 to be the same architected register. Advantageously, because the add_merge microinstruction 612 always specifies a default operand size architected destination register 616, when the add_merge microinstruction 612 acts as a supplier microinstruction it guarantees that the relevant source operand of the consumer microinstruction will be dependent upon only a single microinstruction, rather than multiple microinstructions.

Figure 7:
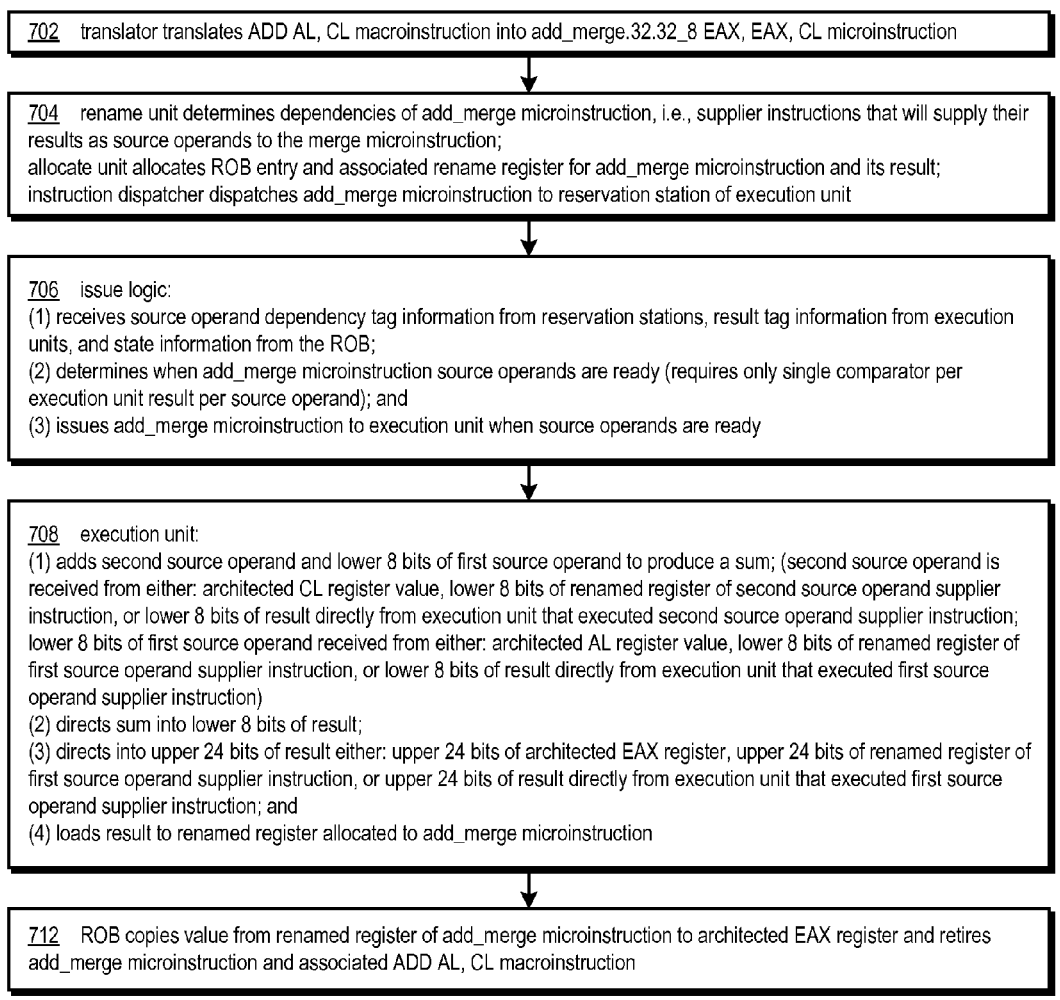
FIG. 7 is a flowchart illustrating operation of the microprocessor of FIG. 1 to execute an x86 ADD AL, CL small result macroinstruction using an add_merge microinstruction of FIG. 6 according to the present invention.

Referring now to FIG. 7, a flowchart illustrating operation of the microprocessor 100 of FIG. 1 to execute an x86 ADD AL, CL small result macroinstruction 602 using a add_merge microinstruction 612 of FIG. 6 according to the present invention is shown. Flow begins at block 702.

At block 702, the instruction translator 124 of FIG. 1 translates an x86 ADD AL, CL small result macroinstruction 602 of FIG. 6 into a add_merge.32.32_8 EAX, EAX, CL microinstruction 612 of FIG. 6. Flow proceeds to block 704.

At block 704, the rename/allocate/dispatch unit 126 determines dependencies of the source operands 618/622 of FIG. 6 of the add_merge microinstruction 612 on supplier microinstructions. The rename/allocate/dispatch unit 126 also allocates an entry in the ROB 136 for the add_merge microinstruction 612 and an associated register in the rename register set 136 for its result. The rename/allocate/dispatch unit 126 then dispatches the add_merge microinstruction 612 and its associated source operand dependency tags 152 to a reservation station 128 of one of the execution units 132. In one embodiment, the add_merge microinstruction 612 is dispatched to either the SINT (Simple Integer) unit or MOV/BR (Move/Branch) unit discussed above. Flow proceeds to block 706.

At block 706, the issue logic 138 receives the source operand dependency tags 152 from the reservation stations 128, the results tags 156 from the execution units 132, and the state information 168 from the ROB 136. In response, the issue logic 138 determines when all of the add_merge microinstruction 612 source operands 618/622 are ready based on the received information 152/156/168. Advantageously, as discussed above, the issue logic 138 need only include N comparators 142, where N is the product of the number of execution units 132, the number of entries in the reservation stations 128, and the number of possible source operands of a microinstruction. Once all of the source operands of the add_merge microinstruction 612 are available, the issue logic 138 issues the add_merge microinstruction 612 to the appropriate execution unit 132. Flow proceeds to block 708.

At block 708, the execution unit 132 to which the add_merge.32.32_8 EAX, EAX, CL microinstruction 612 was issued at block 706 generates the result, i.e., the sum, of the add_merge microinstruction 612 in response to the add_merge microinstruction 612 and to the multiplexing control signals 158 as follows. The execution unit 132 adds the 8-bit second source operand 622 to the lower 8 bits of the first source operand 618 to produce an 8-bit sum. The 8-bit second source operand 622 is received from either the contents of the architected CL register, the lower 8 bits of the renamed register of the supplier instruction indicated by the source operand dependency tag 152 associated with the 8-bit second source operand 622 (i.e., the CL source operand in the example), or the lower 8 bits of the result directly from the execution unit 132 that just executed the supplier microinstruction of the add_merge microinstruction 612 second source operand 622, as controlled by the multiplexing control signals 158 depending upon which of the three data sources has the newest version of the add_merge microinstruction 612 second source operand 622. The lower 8 bits of the first source operand 618 are received from either the contents of the architected AL register, the lower 8 bits of the renamed register of the supplier instruction indicated by the source operand dependency tag 152 associated with the 32-bit first source operand 618 (i.e., the AL source operand in the example), or the lower 8 bits of the result directly from the execution unit 132 that just executed the supplier microinstruction of the add_merge microinstruction 612 first source operand 618, as controlled by the multiplexing control signals 158 depending upon which of the three data sources has the newest version of the add_merge microinstruction 612 second source operand 618. The execution unit 132 directs the 8-bit sum into the lower 8 bits of the result of the add_merge microinstruction 612. Additionally, execution unit 132 directs into the upper 24 bits of the result either the upper 24 bits of the contents of the architected EAX register, the upper 24 bits of the renamed register of the supplier instruction indicated by the source operand dependency tag 152 associated with the 32-bit first source operand 618 (i.e., the EAX source operand in the example), or the upper 24 bits of the result directly from the execution unit 132 that just executed the supplier microinstruction of the add_merge microinstruction 612 first source operand 618, as controlled by the multiplexing control signals 158 depending upon which of the three data sources has the newest version of the add_merge microinstruction 612 first source operand 618. Flow proceeds to block 712.

At block 712, the ROB 136 copies the value from the renamed register allocated to the add_merge microinstruction 612 to the EAX register in the architected register set 136 and retires the add_merge microinstruction 612 and associated x86 ADD AL, CL small result macroinstruction 602. Flow ends at block 712.

Although an embodiment has been described with respect to FIGS. 6 and 7 in which the instruction translator 124 translates an x86 ADD small result macroinstruction 602 into a add_merge microinstruction 612, the microprocessor 100 is configured to translate other x86 small result macroinstructions that perform arithmetic or logical operations into merging microinstructions that perform corresponding arithmetic or logical operations in a manner similar to the add_merge microinstruction 612, such as the x86 ADC, SUB, SBB, INC, DEC, NEG, AND, OR, XOR, NOT, IMUL, MUL, SAR, SHR, SAL, SHL, SHRD, SHLD, ROR, ROL, RCR, RCL, and the various BT (bit test) and SET (set byte) small result macroinstructions. The set of x86 small result macroinstructions 202 that the instruction translator 124 translates into merging microinstructions is a design decision that may be made depending upon the frequency of occurrence of the individual macroinstructions in typical or popular application programs. In one embodiment, the microinstructions include a flag bit in the microinstruction opcode field that indicates whether the microinstruction is a merging or non-merging version of the microinstruction set.

Although embodiments of the present invention have been described in detail, other embodiments are encompassed by the invention. For example, embodiments are contemplated in which the instruction translator translates a first subset of the small result macroinstructions of the macroinstruction set into merge microinstructions, but does not translate a second subset of the small result macroinstructions of the macroinstruction set into merge microinstructions. That is, the microprocessor translates the second subset of small result macroinstructions into small result microinstructions. This requires serialization, which as discussed above is lower performance with respect to the second subset. However, this may be a beneficial cost/performance tradeoff if the small result macroinstructions in the second subset are relatively infrequently used by programs because it may simplify the instruction translator and execution units. According to one of these embodiments, the reservation station includes a flag that is set for all microinstructions that are consumers of the small result microinstruction result and the flag is provided to the issue logic. If a microinstruction has its flag set, the issue logic serializes execution of the microinstruction. That is, the issue logic waits to issue the small result microinstruction until every older microinstruction has retired. This allows each reservation station entry to include a single source operand dependency tag for each source operand rather than multiple tags.

Additionally, although embodiments are described with respect to the IA-32 architecture in which the default register size is 32 bits, other embodiments are contemplated with respect to other architectures in which the default data size is different. For example, embodiments are contemplated with respect to the x86-64 architecture, which includes 64-bit counterparts of the IA-32 general purpose registers.

Still further, embodiments are contemplated in which the merge microinstruction supports different data sizes. For example, in addition to merging data from 8-bit source registers to 32-bit destination registers, as shown in the Figures, the merge microinstruction may support merging data from 8-bit source registers to 64-bit destination registers, 16-bit source registers to 32-bit destination registers, 16-bit source registers to 64-bit destination registers, and 32-bit source registers to 64-bit destination registers. These versions are denoted, respectively, merge.64.64_8, merge.32.32_16, merge.64.64_16, and merge.64.64_32.

Furthermore, although the examples shown in the Figures refer to the x86 EAX, AL, and CL registers, it should be understood that the merge microinstruction supports other source and destination registers, including, but not limited to, the x86 EBX, ECX, EDX, AL, AH, AX, BL, BH, BX, CH, CX, DL, DH, DX registers, and the x86-64 DIL, SIL, BPL, SPL, R8L-R15L, R8W-R15W, R8D-R15D, RAX, RBX, RCX, RDX, RDI, RSI, RBP, RSP, R8-R15 registers. Finally, in one embodiment, the microinstruction set includes a media merge microinstruction that may be included in microcode routines that execute long, complex, or unique macroinstructions, such as trigonometric function macroinstructions, the RSQRT macroinstruction, or the MOVDQ2Q macroinstruction, when a media register data size mismatch occurs.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An out-of-order execution microprocessor for processing a non-memory access macroinstruction that instructs the microprocessor to write an 8-bit result into only a lower 8 bits of an N-bit architected general purpose register of the microprocessor, the microprocessor comprising:

an instruction translator, configured to translate the non-memory access macroinstruction into a single microinstruction, wherein the single microinstruction is a merge microinstruction, wherein the merge microinstruction specifies an N-bit first source register, an 8-bit second source register, and an N-bit destination register to receive an N-bit result, wherein said N-bit first source register and said N-bit destination register are the N-bit architected general purpose register specified by the macroinstruction; and an execution unit, coupled to the instruction translator, configured to receive the merge microinstruction and to responsively generate the N-bit result to be subsequently written to the N-bit architected general purpose register specified by the macroinstruction even though the macroinstruction only instructs the microprocessor to write the 8-bit result into the lower 8 bits of the N-bit architected general purpose register, wherein in order to generate said N-bit result said execution unit is configured to direct the 8-bit result into the lower 8 bits of the N-bit result and to direct the upper N-8 bits of the N-bit first source register specified by the merge microinstruction into corresponding upper N-8 bits of the N-bit result.

2. The microprocessor as recited in claim 1, wherein the macroinstruction specifies an 8-bit architected source register from which to move the 8-bit result to the lower 8 bits of the N-bit architected general purpose register, wherein in response to the merge microinstruction said execution unit is configured to receive the 8-bit result from said 8-bit architected source register in order to direct the 8-bit result into the lower 8 bits of the N-bit result.

3. The microprocessor as recited in claim 1, wherein the macroinstruction instructs the microprocessor to perform an arithmetic or logical operation on an 8-bit source operand to generate the 8-bit result, wherein in response to the merge microinstruction said execution unit is configured to perform said arithmetic or logical operation on said 8-bit second source register in order to generate the 8-bit result directed into the lower 8 bits of the N-bit result by the execution unit.

4. The microprocessor as recited in claim 3, wherein the macroinstruction instructs the microprocessor to add two 8-bit addends to generate the 8-bit result, wherein in response to the merge microinstruction said execution unit is configured to add said 8-bit second source register and the lower 8 bits of said N-bit first source register specified by said merge microinstruction in order to generate the 8-bit result directed into the lower 8 bits of the N-bit result by the execution unit.

5. The microprocessor as recited in claim 1, wherein by writing all N-bits of said N-bit destination register even though the macroinstruction only instructs the microprocessor to write the 8-bit result into the lower 8 bits of the N-bit architected general purpose register, said merge microinstruction guarantees that a source operand of a microinstruction subsequent to said merge microinstruction that specifies said N-bit architected general purpose register as a source operand will be dependent upon only said single merge microinstruction, rather than multiple microinstructions.

6. The microprocessor as recited in claim 1, the microprocessor further comprising:

one or more instruction buffers, collectively having J entries for storing microinstructions waiting to be issued to K execution units of the microprocessor, wherein each of the J microinstructions is allowed to specify up to L source operands;

wherein by writing all N-bits of said N-bit destination register even though the macroinstruction only instructs the microprocessor to write the 8-bit result into the lower 8 bits of the N-bit architected general purpose register, said merge microinstruction enables the microprocessor to include as few as J ×K×L tag comparators for determining which of said microinstructions may be issued to said K execution units during a clock cycle of the microprocessor.

7. The microprocessor as recited in claim 1, wherein by writing all N-bits of said N-bit destination register even though the macroinstruction only instructs the microprocessor to write the 8-bit result into the lower 8 bits of the N-bit architected general purpose register, said merge microinstruction enables the microprocessor to include J comparators per source operand per instruction waiting to issue, wherein J is a number of execution units of the microprocessor that are capable of forwarding their results as a source operand.

8. The microprocessor as recited in claim 1, further comprising:
 at least one instruction buffer, configured to store microinstructions waiting to be executed by said execution unit and configured to store only one tag for each source operand of each of said waiting microinstructions, wherein said tag specifies another microinstruction on which said source operand has a dependency.

9. The microprocessor as recited in claim 1, wherein said N is 32.

10. The microprocessor as recited in claim 1, wherein said N is 64.

11. A method for processing a non-memory access macroinstruction that instructs an out-of-order execution microprocessor to write an 8-bit result into only a lower 8 bits of an N-bit architected general purpose register of the microprocessor, the method comprising:
 translating the non-memory access macroinstruction into a single microinstruction, wherein the single microinstruction is a merge microinstruction, wherein the merge microinstruction specifies an N-bit first source register, an 8-bit second source register, and an N-bit destination register to receive an N-bit result, wherein said N-bit first source register and said N-bit destination register are the N-bit architected general purpose register specified by the macroinstruction, wherein said translating is performed by an instruction translator of the microprocessor; and
 receiving the merge microinstruction and responsively generating the N-bit result to be subsequently written to the N-bit architected general purpose register specified by the macroinstruction even though the macroinstruction only instructs the microprocessor to write the 8-bit result into the lower 8 bits of the N-bit architected general purpose register, wherein said receiving and said generating the N-bit result are performed by an execution unit of the microprocessor;
 wherein said generating the N-bit result comprises:
  directing the 8-bit result into the lower 8 bits of the N-bit result; and
  directing the upper N-8 bits of the N-bit first source register specified by the merge microinstruction into corresponding upper N-8 bits of the N-bit result.

12. The method as recited in claim 11, wherein the macroinstruction specifies an 8-bit architected source register from which to move the 8-bit result to the lower 8 bits of the N-bit architected general purpose register, wherein the method further comprises:
 receiving, in response to the merge microinstruction, the 8-bit result from said 8-bit architected source register prior to said directing the 8-bit result into the lower 8 bits of the N-bit result.

13. The method as recited in claim 11, wherein the macroinstruction instructs the microprocessor to perform an arithmetic or logical operation on an 8-bit source operand to generate the 8-bit result, the method further comprising:
 performing, in response to the merge microinstruction, said arithmetic or logical operation on said 8-bit second source register in order to generate the 8-bit result prior to said directing the 8-bit result into the lower 8 bits of the N-bit result.

14. The microprocessor as recited in claim 13, wherein the macroinstruction instructs the microprocessor to add two 8-bit addends to generate the 8-bit result, the method further comprising:
 adding, in response to the merge microinstruction., said 8-bit second source register and the lower 8 bits of said N-bit first source register specified by said merge microinstruction in order to generate the 8-bit result prior to said directing the 8-bit result into the lower 8 bits of the N-bit result.

15. The method as recited in claim 11, wherein by writing all N-bits of said N-bit destination register even though the macroinstruction only instructs the microprocessor to write the 8-bit result into the lower 8 bits of the N-bit architected general purpose register, said merge microinstruction guarantees that a source operand of a microinstruction subsequent to said merge microinstruction that specifies said N-bit architected general purpose register as a source operand will be dependent upon only said single merge microinstruction, rather than multiple microinstructions.

16. The method as recited in claim 11, wherein by writing all N-bits of said N-bit destination register even though the macroinstruction only instructs the microprocessor to write the 8-bit result into the lower 8 bits of the N-bit architected general purpose register, said merge microinstruction enables the microprocessor to include J comparators per source operand per instruction waiting to issue, wherein J is a number of execution units of the microprocessor that are capable of forwarding their results as a source operand.

17. The method as recited in claim 11, further comprising:
 storing microinstructions waiting to be executed by said execution unit in at least one instruction buffer; and
 storing only one tag for each source operand of each of said waiting microinstructions, wherein said tag specifies another microinstruction on which said source operand has a dependency.

18. The method as recited in claim 11, wherein said N is 32.

19. The method as recited in claim 11, wherein said N is 64.

20. An out-of-order execution microprocessor for processing a non-memory access macroinstruction that specifies a move of an 8-bit source register to an 8-bit destination register, wherein the 8-bit destination register is a subset of an N-bit register in the macro-architecture of the microprocessor, the microprocessor comprising:
 a translator, configured to translate the non-memory access macroinstruction into a single microinstruction, wherein the single microinstruction is a merge microinstruction, wherein the merge microinstruction specifies an N-bit first source register, an 8-bit second source register, and an N-bit destination register, wherein the first source register and the destination register are the same; and
 an execution unit, coupled to the translator, configured to receive the merge microinstruction and in response thereto:
  load the 8 bits of the merge microinstruction second source register into the lower 8 bits of the merge microinstruction destination register; and
  load the upper N-8 bits of the merge microinstruction first source register into corresponding upper N-8 bits of the merge microinstruction destination register.

21. An out-of-order execution microprocessor for processing a non-memory access macroinstruction that specifies an arithmetic logic unit (ALU) operation to be performed on an 8-bit source register to generate a result for writing to an 8-bit destination register, wherein the 8-bit destination register is a subset of an N-bit register in the macro-architecture of the microprocessor, the microprocessor comprising:
 a translator, configured to translate the non-memory access macroinstruction into a single microinstruction, wherein the single microinstruction is a merge microinstruction, wherein the merge microinstruction specifies an N-bit first source register, an 8-bit second source register, and an N-bit destination register, wherein the first source register and the destination register are the same; and an execution unit, coupled to the translator, configured to receive the merge microinstruction and in response thereto:

perform the ALU operation on the lower 8 bits of the merge microinstruction first source register and the 8 bits of the merge microinstruction second source register to generate an 8-bit result;

load the 8-bit result of the ALU operation into the lower 8 bits of the merge microinstruction destination register; and load the upper N-8 bits of the merge microinstruction first source register into corresponding upper N-8 bits of the merge microinstruction destination register.

\* \* \* \* \*